United States Patent
Jaspert (10) Patent No.: US 12,158,133 B2
(45) Date of Patent: Dec. 3, 2024

(54) SUBMERGED HYDROELECTRIC GENERATOR SYSTEM

(71) Applicant: George Jaspert, Carlsbad, CA (US)

(72) Inventor: George Jaspert, Carlsbad, CA (US)

( * ) Notice: Subject to any disclaimer, the term of this patent is extended or adjusted under 35 U.S.C. 154(b) by 0 days.

(21) Appl. No.: 17/462,807

(22) Filed: Aug. 31, 2021

(65) Prior Publication Data

US 2023/0063216 A1    Mar. 2, 2023

(51) Int. Cl.
*F03B 13/10*    (2006.01)
*H02K 7/18*    (2006.01)

(52) U.S. Cl.
CPC ........... *F03B 13/10* (2013.01); *H02K 7/1823* (2013.01); *F05B 2220/706* (2013.01); *F05B 2240/93* (2013.01)

(58) Field of Classification Search
CPC . F03B 13/10; H02K 7/1823; F05B 2220/706; F05B 2240/93
USPC ...................................... 290/43, 54
See application file for complete search history.

(56) References Cited

U.S. PATENT DOCUMENTS

| | | | |
|---|---|---|---|
| 3,934,964 A | 1/1976 | Diamond | |
| 4,180,976 A * | 1/1980 | Bunn | F03B 13/086 290/43 |
| 4,219,423 A * | 8/1980 | Smith, Jr. | B01D 29/54 210/167.14 |
| 4,284,899 A | 8/1981 | Bendiks | |
| 4,341,490 A | 7/1982 | Keeling | |
| 4,410,433 A * | 10/1983 | Arvanitakis | B01D 37/02 210/111 |
| 6,176,899 B1 * | 1/2001 | Murphy | B01D 19/0005 95/263 |
| 8,946,922 B1 * | 2/2015 | Johnson | F03B 17/061 290/53 |
| 2005/0073154 A1 * | 4/2005 | Dudley | F03B 17/025 290/54 |
| 2009/0008940 A1 | 1/2009 | Strain | |
| 2009/0160193 A1 * | 6/2009 | Farb | F03B 13/00 415/60 |
| 2009/0289458 A1 | 11/2009 | Juneau | |
| 2009/0302613 A1 * | 12/2009 | Ullman | F03B 13/22 290/54 |
| 2010/0264658 A1 * | 10/2010 | Torres Martinez | F03B 13/148 290/55 |

(Continued)

FOREIGN PATENT DOCUMENTS

| | | | | |
|---|---|---|---|---|
| GB | 2578473 A | * | 5/2020 | ............... F03B 1/00 |
| KR | 20110003846 A | * | 1/2011 | |

*Primary Examiner* — Charles Reid, Jr.
(74) *Attorney, Agent, or Firm* — Boudwin Intellectual Property Law; Daniel Boudwin (57) ABSTRACT

A submerged hydroelectric generator system includes a peg stock. The peg stock is defined between a first end and an oppositely defined second end. The first end is positioned in a manner to allow fluid entering the first end of the peg stock will flow towards the second end of the peg stock. An intake valve is placed at the first end of the peg stock to allow water to flow into the first end of the peg stock. One or more generators are mounted on the peg stock. The generators are designed to generate power from energy generated by the water flowing through the peg stock. An outlet valve is installed on the second end of the peg stock to release water from the peg stock as water enters the peg stock.

3 Claims, 6 Drawing Sheets

(56) References Cited

U.S. PATENT DOCUMENTS

| | | | |
|---|---|---|---|
| 2011/0162356 A1 | 7/2011 | Hastings | |
| 2014/0312623 A1* | 10/2014 | Anteau | F03B 13/08 |
| | | | 290/52 |
| 2017/0122148 A1* | 5/2017 | Katta | F01L 13/0031 |
| 2018/0258840 A1* | 9/2018 | Yoeda | F01N 5/04 |
| 2020/0191109 A1* | 6/2020 | Hector, Jr. | H02K 7/1823 |
| 2021/0404433 A1* | 12/2021 | Kloster | F03B 13/06 |

* cited by examiner

SUBMERGED HYDROELECTRIC GENERATOR SYSTEM

BACKGROUND OF THE INVENTION

The present invention relates to hydropowered electric generator systems. More particularly, the present invention provides an electrical generator that is designed to work via energy generated from currently untapped, continuously moving water sources.

As the human population grows and expands into new geographic locations, the need for energy to power homes, infrastructure, businesses and the like increases. Meeting this increasing demand for electricity consumption is a significant challenge in today's economy. Even though there have been improvements in electricity generation and a marked growth of alternative energy systems over the years, new and existing environmental concerns have made urgent the need for innovation in the field of usable power generation. Green energy, wind farms, and solar farms have been installed to attempt to address some of these concerns, however, the need for renewable energy remains dire.

Hydroelectric power has shown promise as a clean source of renewable energy. One example of an effective hydroelectric power source is an arch-gravity dam, such as the Hoover Dam. These systems generally rely upon the use of water flow diversion to direct natural water flows through turbines to generate electricity. A disadvantage of these systems is that natural water flows may change over time. For example, the electric output of the Hoover Dam has decreased over time as the water level of Lake Mead has decreased.

Consequently, there is a need for an improvement in the art of electrical generation. The present invention substantially diverges in design elements from the known art while at the same time solves a problem faced when attempting to supply power to areas of large consumption. In this regard the present invention substantially fulfills these needs.

The submerged hydroelectric generator system works in a similar manner to the Hoover dam concept of a gravity-driven water flow. One difference is that the submerged hydroelectric generator system creates a flow of water in a completely submerged environment, as opposed to utilizing a naturally created flow of water, such as a waterfall or river flow. By utilizing an artificially created water flow, the need to utilize specific locations, such as rivers, streams, reservoirs or lakes is decreased, as the submerged hydroelectric generator system is capable of operation in any body of water of sufficient depth. Because of the high number of suitable locations for the submerged hydroelectric generator system, the system will be able to provide renewable energy to buildings, communities, coastal cities, islands and to existing utility companies.

SUMMARY OF THE INVENTION

In view of the foregoing disadvantages inherent in the known types of renewable energy generators now present in the prior art, the present invention provides a submerged hydroelectric generator system wherein the same can be utilized for providing convenience when generating energy from the movement of water through a peg stock.

The submerged hydroelectric generator system comprises a peg stock. The peg stock comprises a first end defined oppositely a second end. The first end is positioned such that fluid entering the first end of the peg stock will be gravitationally directed towards the second end of the peg stock. An intake valve is disposed at the first end of the peg stock. The intake valve is configured to selectively allow water to flow into the first end of the peg stock. At least one generator is disposed on the peg stock. The generators are designed to generate power from energy generated by the water flow through the peg stock. An outlet valve is disposed on the second end of the peg stock. The outlet valve is configured to release water from the peg stock as water enters the peg stock.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Reference is made herein to the attached drawings. Like reference numerals are used throughout the drawings to depict like or similar elements of the submerged hydroelectric generator system. The figures are intended for representative purposes only and should not be considered to be limiting in any respect.

Figure 1:
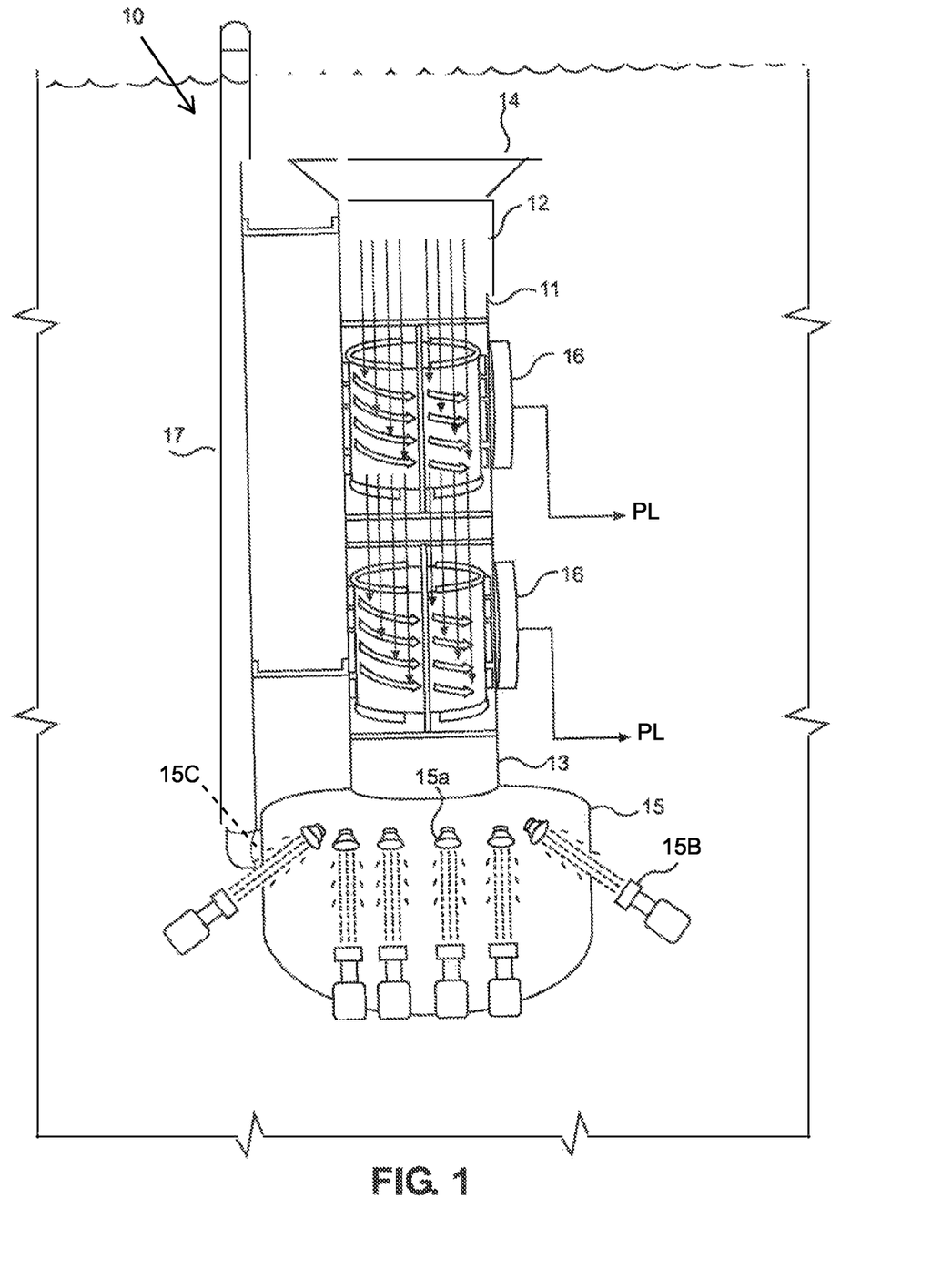
FIG. 1 shows a perspective view of an embodiment of the submerged hydroelectric generator system.

Referring now to FIG. 1, there is shown a perspective view of an embodiment of the submerged hydroelectric generator system. The submerged hydroelectric generator system comprises a peg stock 11. The peg stock 11 defines a first end 12 opposite a second end 13. In the illustrated embodiment, the peg stock 11 is vertically oriented. The peg stock 11 is made of water-resistant materials, such that it can be placed in an underwater environment and resistant to water damage over time. The height and diameter of the peg stock 11 can be of any desired length, size or dimension. Providing a peg stock 11 of an increased diameter will increase the eventual power output of the submerged hydroelectric generator system 10.

The peg stock 11 comprises an intake valve 14 disposed proximate to the first end 12 of the peg stock 11. The intake valve 14 is configured to receive water into the peg stock 11. Ideally, the intake valve 14 will be placed at a depth at least 50 feet beneath the surface of the body of water in which the submerged hydroelectric generator 10 is placed, such that a continuous volume of water may enter the peg stock 11. In one embodiment, the volume of water entering the peg stock 11 may be controlled utilizing a valve regulator 14*a*, such as a time valve system implemented upon the intake valve 14. The time valve system is designed to selectively permit volumes of water into the peg stock 11. In some embodiments, the intake valve 14 comprises a filter 14b. The filter 14b is configured to prevent flotsam, debris or aquatic wildlife from entering the peg stock 11.

Opposite the intake valve 14, the peg stock 11 comprises an outlet valve 15. The outlet valve 15 is disposed proximate to the second end 13 of the peg stock 11. The outlet valve 15 is configured to expel water from the peg stock 11. In the illustrated embodiment, the outlet valve 15 comprises a low frequency sound system 15a and a plurality of aerator devices. In such an embodiment, the low frequency sound system 15a will generate pressure within the outlet valve 15 and the aerator devices 15b will utilize compressed air bubbles to release the water from the outlet valve 15 and to maintain zero net head pressure. The aerator devices 15b produce air bubbles using air drawn in from the surrounding environment. In the illustrated embodiment, air is drawn in through an air vent 17. By expelling air and water, the outlet valve 15 can operate more efficiently. Furthermore, in some embodiments, additional mechanisms, such as a vacuum-generation rotor (FIG. 5, (51A) or a turbofan engine (FIG. 5, (51), may be utilized to eject water from the outlet valve 15. The relatively low energy consumption of the low frequency sound system 15a and the aerator devices 15b reduces the energy consumption of the outlet valve 15, resulting in an increased net energy output.

At least one generator 16 is disposed within the peg stock 11 between the first end 12 and the second end 13. Each generator 16 is configured to gather energy from the action of the water entering the intake valve 14 falling downward upon the generator 16. Furthermore, each generator 16 is adapted to operate in a subaquatic environment. In some embodiments, the generator 16 comprises a power line PL extending outward therefrom, such that the generator 16 may supply power to a power source. In the illustrated embodiment, a pair of spindle generators 16 are provided. The spindle generators 16 are designed to rotate as the water falls upon a plurality of internal fins defined by each spindle generator 16. The size, voltage, and output of the generators 16 may vary depending on the size, location, and environment of the submerged hydroelectric generator system 10. The use of a plurality of generators 16 will increase the energy output of the submerged hydroelectric generator system 10. The outlet valve 15 may also comprise an air injection valve 15C.

Figure 2:
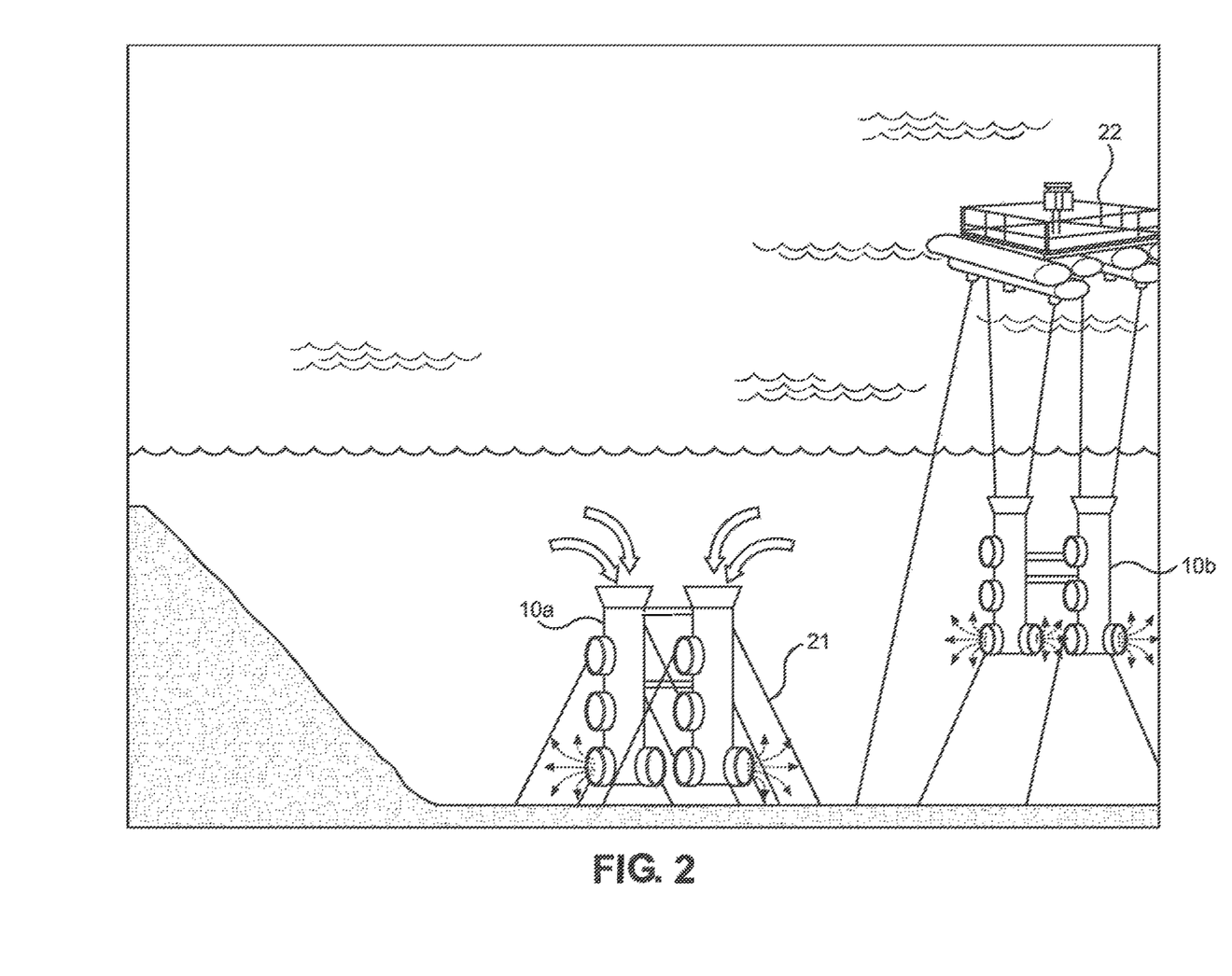
FIG. 2 shows a demonstrative view of an embodiment of the submerged hydroelectric generator system in use.

Referring now to FIG. 2, there is shown a demonstrative view of an embodiment of the submerged hydroelectric generator system in use. The submerged hydroelectric generator system may be installed in any desired body of water, such as an ocean, a sea, a lake, a river, a reservoir and the like. In the illustrated embodiment, a pair of submerged hydroelectric generator systems 10a, 10b are shown in a natural body of water. Ideally the submerged hydroelectric generator system 10a will be installed at a depth of 200 feet below the water surface level or greater. The depth of the underwater installation will protect the submerged hydroelectric generator systems 10a, 10b from natural phenomenon such as high turbulent currents, hurricane turbulence and above surface freezing conditions. The submerged hydroelectric generator system can be operated 800 feet beneath the water surface level during hurricanes to prevent or limit damage to the system.

The first submerged hydroelectric generator system 10a is anchored to a sea floor of a body of water via a plurality of tethers 21. The tethers 21 are of a desired length to maintain the position of the submerged hydroelectric generator system 10a at a desired depth. The tethers 21 may be installed via a flotation platform 22. Furthermore, in the illustrated embodiment each submerged hydroelectric generator system 10a, 10b comprises a pair of parallel oriented peg stocks 11. As such, each submerged hydroelectric generator system 10a, 10b is built with a redundancy to prevent power disruption in the event of a machine failure or scheduled maintenance.

Figure 3:
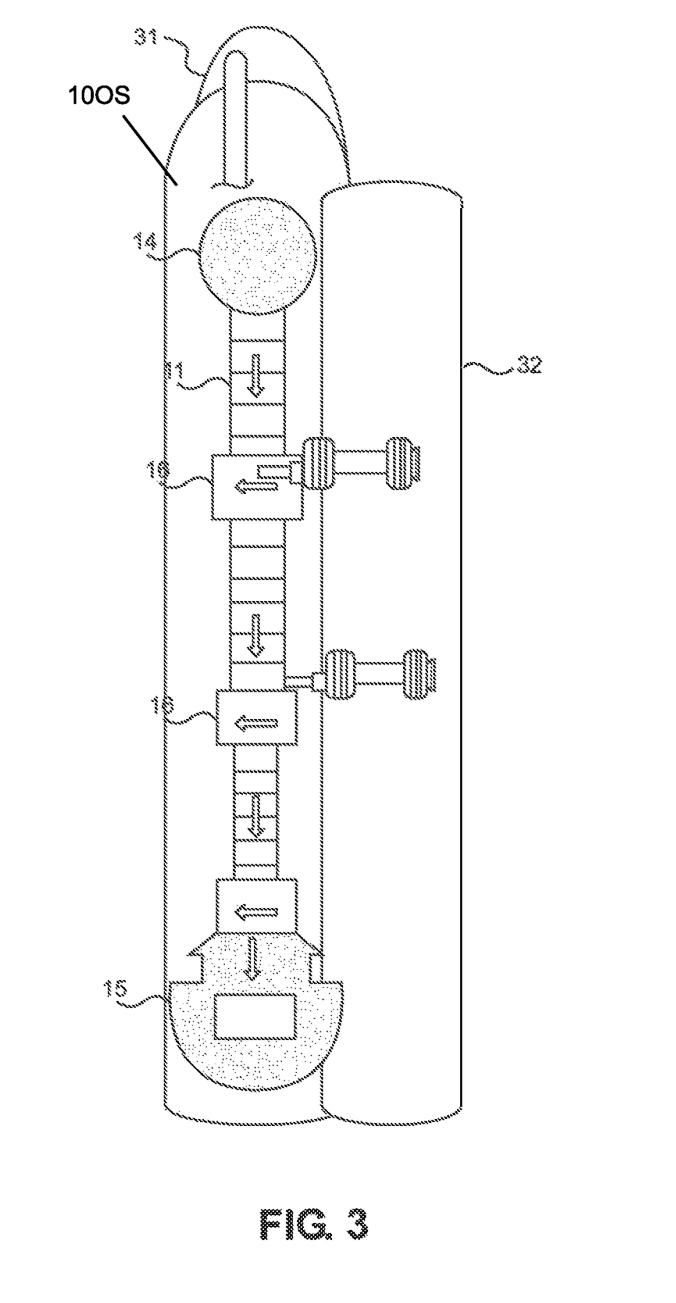
FIG. 3 shows a demonstrative view of an onshore embodiment of the submerged hydroelectric generator system in use.

Referring now to FIG. 3, there is shown a demonstrative view of an onshore embodiment of the submerged hydroelectric generator system 10 in use. In one embodiment, the submerged hydroelectric generator system 10 may be installed in an onshore tower 10OS. The submerged hydroelectric generator system 10 comprises a system housing 31 in which the intake valve 14, the peg stock 11, the generators 16, and the outlet valve 15 are installed. The system housing 31 is disposed adjacent to a fluid reservoir 32. As fluid enters the intake valve 14, it passes through the peg stock 11 and the generators 16 and is expelled through the outlet valve 15 and will enter the fluid reservoir 32. Because of the fluid pressure generated as fluid is expelled into the fluid reservoir 32, fluid will re-enter the system housing 31 and once again pass through the intake valve 14.

Figure 4:
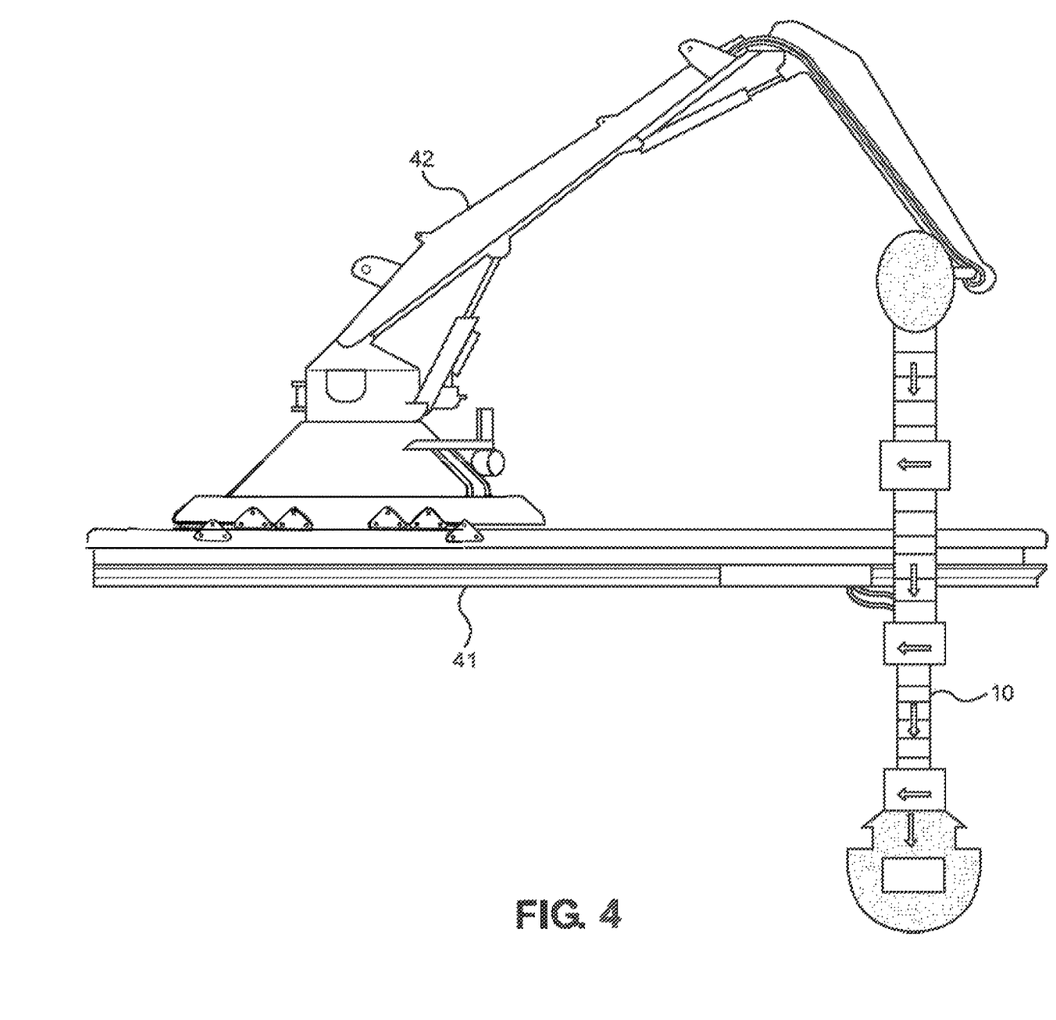
FIG. 4 shows a demonstrative view of a ship-mounted embodiment of the submerged hydroelectric generator system in use.

Referring now to FIG. 4, there is shown a demonstrative view of a ship-mounted embodiment of the submerged hydroelectric generator system in use. In the illustrated embodiment, the submerged hydroelectric generator system 10 is secured to a ship 41. Specifically, the ship 41 comprises a movable arm 42 on which the submerged hydroelectric generator system 10 is installed on the distal end of. The movable arm 42 is able to submerge the submerged hydroelectric generator system 10 and to enable the submerged hydroelectric generator system 10 to operate in an underwater location. By installing the submerged hydroelectric generator system 10 upon the ship 41, the submerged hydroelectric generator system 10 can be moved from one location to another. Furthermore, in some embodiments, the submerged hydroelectric generator system 10 can be used to power the ship's 41 engines and onboard power supply. The movement through the water from the ship's 41 motion enables zero net head pressure with less exhaust energy exhaust from the valves.

Figure 5:
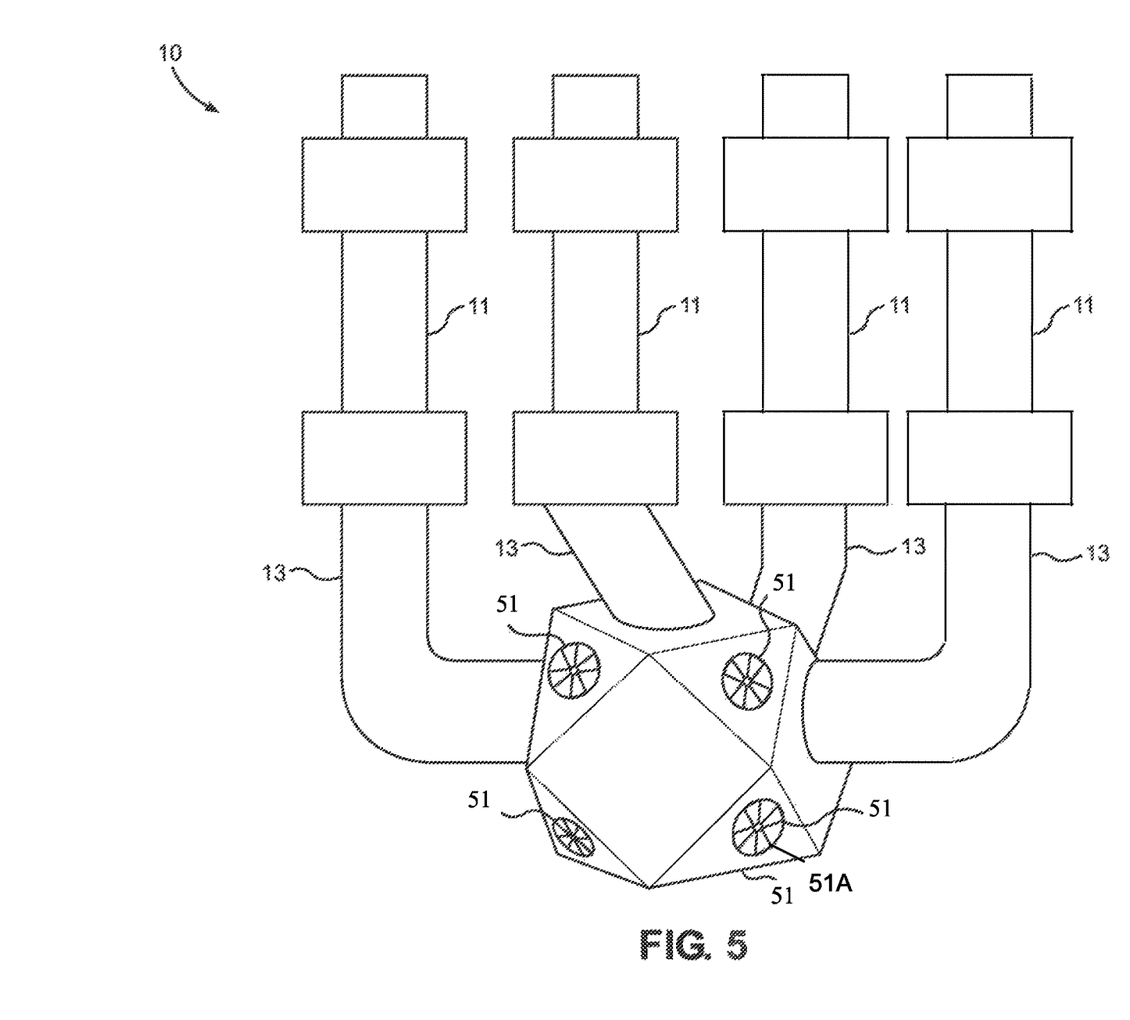
FIG. 5 shows a perspective view of an embodiment of the submerged hydroelectric generator system.

Referring now to FIG. 5, there is shown a perspective view of an embodiment of the submerged hydroelectric generator system. In the illustrated embodiment, the submerged hydroelectric generator system 10 comprises a plurality of peg stocks 11. The plurality of peg stocks 11 each comprises an independent intake valve 14 and at least one generator 16. The second end 13 of each peg stock 11 is in operable connection with a singular outlet valve 15. As such, the outlet valve 15 is able to expel water entering the submerged hydroelectric generator system 10 through all of the peg stocks 11.

In the specific embodiment, the outlet valve 15 is a cuboctahedron. As such, each peg stock 11 is connected to a square face portion of the cuboctahedron outlet valve 15. In the illustrated embodiment, each triangle portion of the cuboctahedron outlet valve 15 comprises a turbofan engine 51. Alternatively, in other embodiments, the triangle portions of the cuboctahedron outlet valve 15 may comprise a low frequency sound system, such that the water may be displaced from the outlet valve 15 through sound displacement. In the illustrated embodiment, the cuboctahedron shape enables the inflow from the peg stocks 11 to create an internal whirlpool, which is displaced from the peg stock 11 by the actions of the outlet valve mechanisms disposed on the triangle portions.

Figure 6:
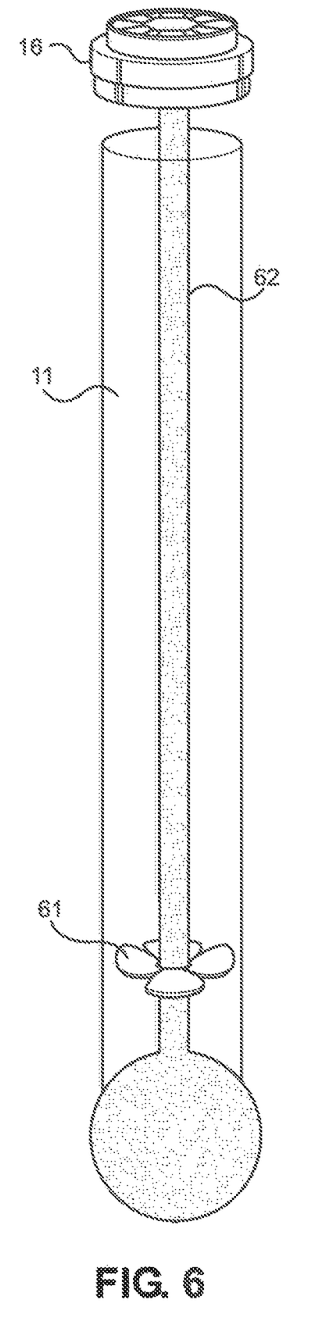
FIG. 6 shows a perspective view of an alternate embodiment of the submerged hydroelectric generator system.

Referring now to FIG. 6, there is shown a perspective view of an alternate embodiment of the submerged hydroelectric generator system. In the illustrated embodiment, the generator 16 is disposed at the first end 12 of the peg stock 11. The generator 16 comprises a rotor 61 disposed at a distal end of a shaft 62 in operable connection with the generator 16. As such, when the rotor 61 is engaged by the water current, the shaft 62 will rotate, creating energy that is preserved within the generator 16 for distribution.

It is therefore submitted that the instant invention has been shown and described in various embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A submerged hydroelectric generator system, comprising:
    a vertical peg stock comprising a first end and a second end;
    an intake valve receiving the first end of the peg stock;
        wherein the intake valve comprises a filter;
        wherein the intake valve comprises a valve regulator;
            further wherein the valve regulator comprises a time valve system;
    at least one generator disposed within the peg stock;
        further wherein the generator is disposed at the first end of the peg stock
        wherein the generator comprises a spindle generator;
    an outlet valve disposed at the second end of the peg stock;
    wherein the outlet valve is configured to release water from the peg stock;
    wherein the peg stock is affixed to a ship;
    wherein the outlet valve includes a low frequency sound system and a plurality of aerator devices;
        further wherein the outlet valve comprises an air vent;
    wherein the low frequency sound system displaces compressed air bubbles generated by the plurality of aerator devices.

2. A submerged hydroelectric generator system, comprising:
    a peg stock comprising a first end and a second end;
    an intake valve disposed at the first end of the peg stock;
    at least one generator disposed within the peg stock;
    an outlet valve disposed at the second end of the peg stock;
    wherein the outlet valve is configured to release water from the peg stock;
    wherein the outlet valve includes a vacuum-generation rotor configured to displace water from the outlet valve; and
    further wherein the outlet valve includes a turbofan engine that flushes water out of the peg stock configured to displace water from the outlet valve.

3. A submerged hydroelectric generator system, consisting of:
    a vertical peg stock comprising a first end and a second end;
    an intake valve receiving the first end of the peg stock;
        wherein the intake valve comprises a filter;
        wherein the intake valve comprises a valve regulator;
            further wherein the valve regulator comprises a time valve system;
    at least one generator disposed within the peg stock;
        wherein the generator is disposed at the first end of the peg stock;
        wherein the generator comprises a spindle generator;
    an outlet valve disposed at the second end of the peg stock;
    wherein the outlet valve is configured to release water from the peg stock;
    wherein the outlet valve includes a vacuum-generation rotor configured to displace water from the outlet valve;
    wherein the outlet valve is configured to release water from the peg stock;
    wherein the peg stock is affixed to a ship;
    wherein the outlet valve includes a low frequency sound system and a plurality of aerator devices;
        further wherein the outlet valve comprises an air vent; and
    wherein the low frequency sound system displaces compressed air bubbles generated by the plurality of aerator devices.

* * * * *